US008589355B2

(12) United States Patent
Nagpal et al.

(10) Patent No.: US 8,589,355 B2
(45) Date of Patent: *Nov. 19, 2013

(54) DATA STORAGE IN A CLOUD

(75) Inventors: Abhinay R. Nagpal, Pune (IN);
Sandeep R. Patil, Elmsford, NY (US);
Sri Ramanathan, Lutz, FL (US);
Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 131 days.

This patent is subject to a terminal disclaimer.

(21) Appl. No.: 12/916,248

(22) Filed: Oct. 29, 2010

(65) Prior Publication Data

US 2012/0110044 A1    May 3, 2012

(51) Int. Cl.
*G06F 17/00* (2006.01)
*G06F 17/30* (2006.01)

(52) U.S. Cl.
USPC ............ 707/653; 707/694; 707/827; 709/201

(58) Field of Classification Search
USPC .......... 707/654, 692, 694, 696, 999.006, 653, 707/827; 709/201, 206
See application file for complete search history.

(56) References Cited

U.S. PATENT DOCUMENTS

| 7,403,939 | B1 | 7/2008 | Virdy | |
|---|---|---|---|---|
| 7,636,785 | B2 | 12/2009 | Shahine et al. | |
| 7,711,767 | B2 | 5/2010 | Agrawal et al. | |
| 8,392,838 | B2* | 3/2013 | Chawla et al. | 715/748 |
| 2002/0023010 | A1 | 2/2002 | Rittmaster et al. | |
| 2003/0041167 | A1 | 2/2003 | French et al. | |
| 2007/0168405 | A1 | 7/2007 | Pomerantz | |
| 2010/0332454 | A1* | 12/2010 | Prahlad et al. | 707/654 |
| 2011/0246427 | A1* | 10/2011 | Modak et al. | 707/653 |
| 2011/0282975 | A1* | 11/2011 | Carter | 709/220 |
| 2012/0078643 | A1* | 3/2012 | Nagpal et al. | 707/812 |

FOREIGN PATENT DOCUMENTS

WO    01/08021 A1    2/2001

* cited by examiner

*Primary Examiner* — Marc Filipczyk
(74) *Attorney, Agent, or Firm* — Griffiths & Seaton PLLC

(57) ABSTRACT

Methods and systems for managing storage of data in a cloud by receiving a request, wherein the request includes information to store data within a cloud, environment comprising a plurality of data storages coupled to each other over a network; routing the data to be stored within a specific location of storage within the cloud environment by checking for any regulatory compliance. Other embodiments are also disclosed.

17 Claims, 5 Drawing Sheets

DATA STORAGE IN A CLOUD

TECHNICAL FIELD

Embodiments of present invention generally relates to cloud computing, and more particularly towards determining and controlling a geographic region of data in cloud environment.

BACKGROUND

Cloud computing is Internet-based computing, where shared resources, software, and information are provided to computers and other devices on demand, somewhat like an electricity grid. Cloud computing is a paradigm shift in the filed of computing. Details are abstracted from the users, who no longer have need for expertise in, or control over, the technology infrastructure "in the cloud" that supports them. Cloud computing describes a new supplement, consumption, and delivery model for IT services based on the Internet, and it typically involves over-the-Internet provision of dynamically scalable and often virtualized resources. Typical cloud computing providers deliver common business applications online that are accessed from another Web service or software like a Web browser, while the software and data are stored on servers. A key element of cloud computing is customization and the creation of a user-defined experience.

SUMMARY

Embodiment of the invention are related to a method, system and computer program product for managing storage of data in a cloud by receiving a request, wherein the request includes information to store data within a cloud, environment comprising a plurality of data storages coupled to each other over a network; routing the data to be stored within a specific location of storage within the cloud environment further comprising determining a set of pre-defined attributes associated with the data, wherein the attributes are a set of pre-defined rules; selecting the specific location of storage within the cloud environment is based on the set of pre-defined attributes associated with the data, wherein the data may be structured or unstructured; and checking the pre-defined attributes for any regulatory compliance prior to routing the data to be stored within the specific location of storage within the cloud environment. Other embodiments are also disclosed.

BRIEF DESCRIPTION OF THE SEVERAL VIEWS OF THE DRAWINGS

Embodiments of the invention are described below, by way of example only, with reference to the following schematic drawings, where.

DETAILED DESCRIPTION

Embodiments of the present invention generally relates to method and system for cloud computing, for controlling data within a geographical region in a cloud. A user may specify one or more geographic regions, for a set of available geographies of the cloud environment within which the cloud is represented in which to save data. In one embodiment, for example, the user selects the geographical region from at least one of (i) user-selected attributes, which can be file attributes or any such attributes associated with the data (also referred to as files) to be saved, or (ii) a set of predefined rules, which may be defined by the user or dynamically generated based on the selection made by the user on the geography to save the data. The rule may be based various parameters such as file content, semantic data, user identity, group association, local computing device location, etc. It should be obvious to a person skilled in the art that there cloud be various other parameters associated with the data, and these would fall within the scope of the present invention. A routing system, preferably in terms of software agents or hardware or a combination thereof, preferably with intelligence built into the routing system, is configured to preferably determine the user-specified geographical region(s), then preferably identify a data storage center within the specified geographical region(s), and route the data to the identified data storage center for physical storage of the data. Therefore, embodiments of the invention advantageously provide a user with the ability and flexibility to control where the specified data is physically stored in a cloud environment.

It should be understood to one skilled in the art although embodiments of the present invention are related to cloud computing, and to a cloud environment, the embodiments of the present invention recited herein are not limited to a cloud computing environment. Rather, embodiments of the present invention are capable of being implemented in conjunction with any other type of computing environment.

Cloud computing is a model of service delivery that enables convenient, on-demand network access to a shared pool of configurable resources, for example including and not limited to networks, network bandwidth, servers, processing, memory, storage, applications, virtual machines, and services, which can be rapidly provisioned and released with minimal management effort or interaction with a provider of the service.

Figure 1:
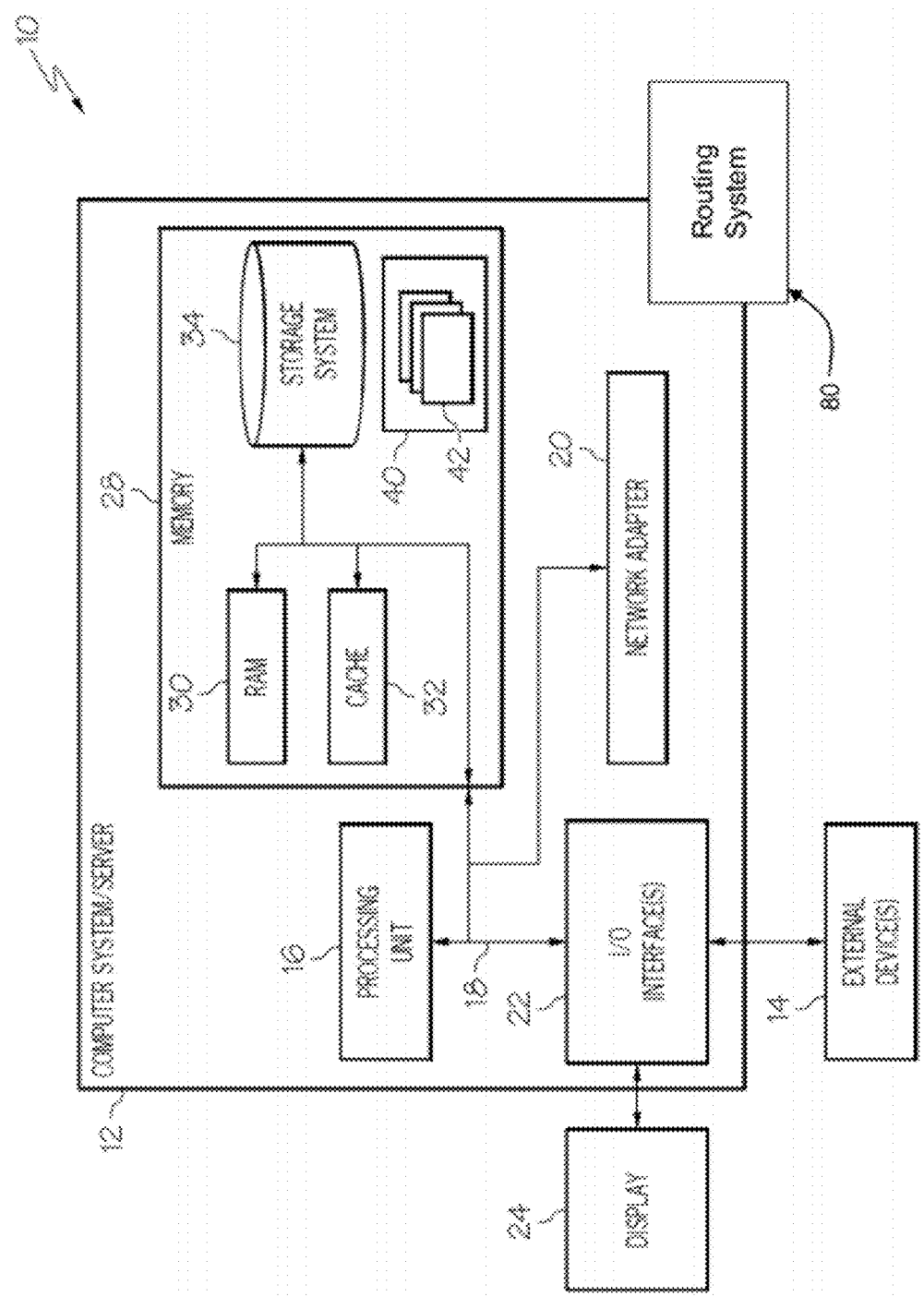
FIG. 1 depicts an exemplary embodiment of a cloud computing node on which the method of FIG. 5 may be implemented.

Reference is now made to FIG. 1, which illustrates an exemplary embodiment of an example of a cloud computing node. Cloud computing node 10, herein after also referred to as a cloud computing environment or cloud computing in general, as illustrated is one example of a suitable cloud computing node and is not intended to suggest any limitation as to the scope of use or functionality of embodiments of the invention described herein. Regardless, cloud computing node 10 is capable of being implemented and/or performing any of the functionality well known to a person of ordinary skill in the art. In a further exemplary embodiment, FIG. 1 may also represent a computing infrastructure capable of performing and/or implementing tasks and/or functions of the method(s) described herein.

In cloud computing node 10 there is a system/server 12, preferably any data processing system (hereinafter also referred to as a computer system) having at least a memory and a processor, which is operational with numerous other general purpose or special purpose computing system environments or configurations. For example well-known illustrations include computing systems, environments, and/or configurations that may be suitable for use with system/server 12. These include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one embodiment, system/server 12 may be described in the general context of computer system-executable instructions, such as program modules, being executed by a computer system. Generally, program modules may include routines, programs, objects, components, logic, data structures, set of instruction and so on that are configured to perform particular tasks or implement particular abstract data types. System/server 12 may be performed on a distributed cloud computing environments, where tasks are typically performed by remote processing devices, and these processing devices are linked/coupled through a communications network. In a distributed cloud computing environment, program modules may be located in both local and remote computer system storage media including memory storage devices.

As illustrated in an exemplary embodiment of FIG. 1, computer system/server 12 in cloud computing node 10 is illustrated in the form of a general-purpose computing device. The components of computer system/server 12 may include, but are not limited to, one or more processors or processing units 16, a system memory 28, and a bus 18 that couples various system components including system memory 28 to processor 16. In embodiments, the computer system/server 12 comprises or communicates with a routing system 80, which preferably has intelligence built into it. Routing system 80 may be a software agent or a hardware element or a combination thereof, and work in unison when such a system is a combination of software and hardware.

In one embodiment, bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

In a further embodiment, system/server 12 typically includes a variety of computer system readable media. Such media may be any available media that is accessible by system/server 12, and it includes both volatile and non-volatile media, removable and non-removable media.

In a further embodiment, system memory 28 may include computer system readable media in the form of volatile memory, such as random access memory (RAM) 30 and/or cache memory 32. System/server 12 may further include other removable/non-removable, volatile/non-volatile computer system storage media. By way of example only, and not limited to, storage system 34 may be provided for reading from and writing to a non-removable, non-volatile magnetic media (not shown in the Figure, but such media being typically referred to as a "hard drive"). Although not shown in the figure, a magnetic disk drive for reading from and writing to a removable, non-volatile magnetic disk, for example a "floppy disk", and/or an optical disk drive for reading from or writing to a removable, non-volatile optical disk such as a CD-ROM, DVD-ROM or other optical media may also be provided. In such instances, each of these devices can be coupled to bus 18 by one or more data media interfaces. As will be further depicted and described in the embodiment below, memory 28 may include at least one program product having a set (e.g., at least one) of program modules that are configured to carry out the functions as disclosed in accordance with the embodiments of the invention.

In a further embodiment, program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

In yet a further embodiment, system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. In one embodiment, such communication can occur via I/O interfaces 22. In yet a further embodiment, system/server 12 can communicate with one or more networks such as a local area network (LAN), a general wide area network (WAN), and/or a public network (e.g., the Internet) via network adapter 20. As illustrated in FIG. 1, network adapter 20 communicates with the other components of system/server 12 via bus 18. It should be understood that although not shown, other hardware and/or software components cloud be used in conjunction with system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
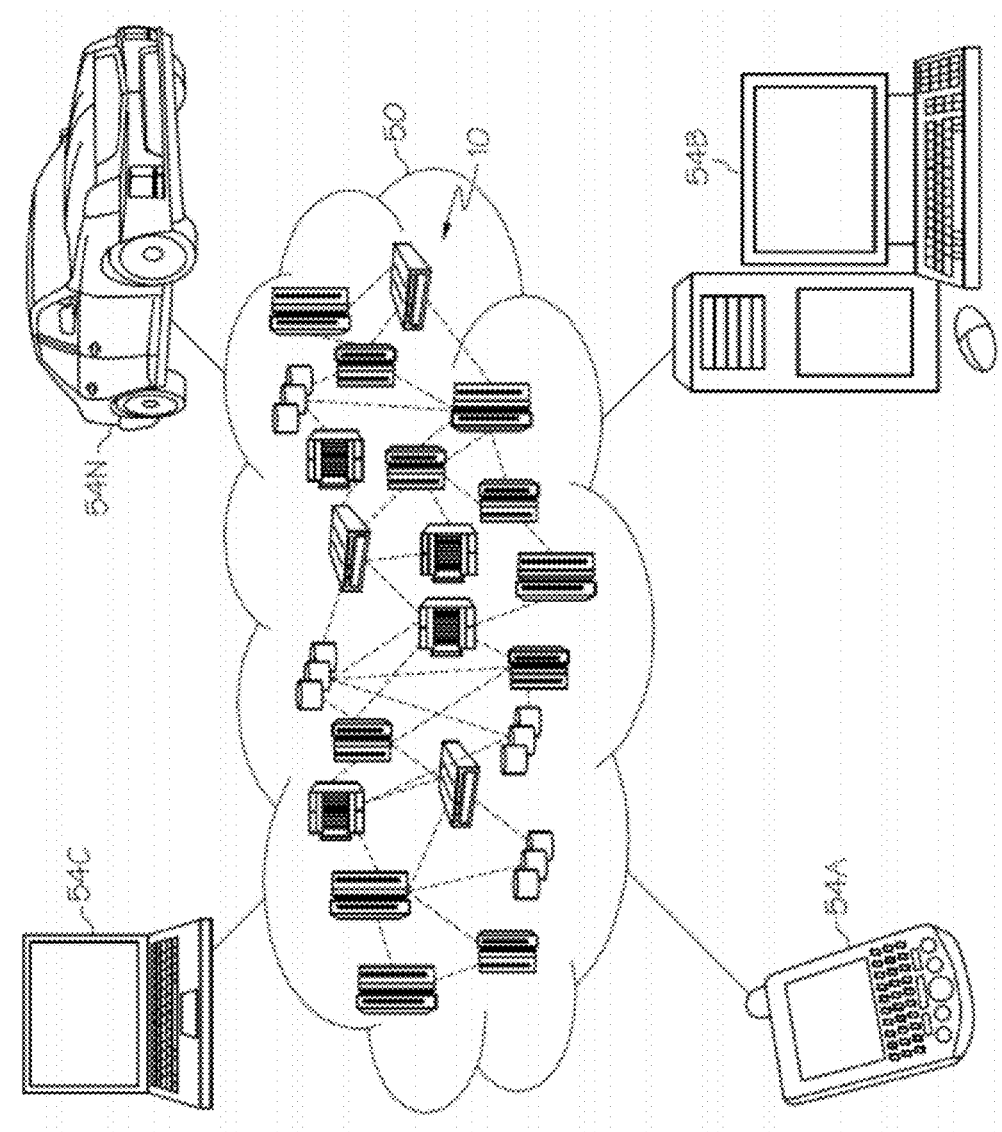
FIG. 2 depicts an exemplary embodiment of a cloud computing environment.

Reference is now made to FIG. 2, whish illustrates an exemplary embodiment of a cloud computing environment 50. As illustrated in the exemplary embodiment, cloud computing environment 50 includes one or more cloud computing nodes 10 with which other computing devices used by cloud consumers, for example, personal digital assistant (PDA) or cellular telephone 54A, desktop computer 54B, laptop computer 54C, and/or automobile computer system 54N may communicate within the cloud environment 50. Nodes 10 may communicate with each other as well. They may be grouped (not shown in the figure) physically or virtually, in one or more networks, such as Private, Community, Public, or Hybrid clouds or a combination thereof. This allows cloud computing environment 50 to offer infrastructure, platforms and/or software as services for which a cloud consumer does not need to maintain resources on a local computing device. It is understood that the various types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
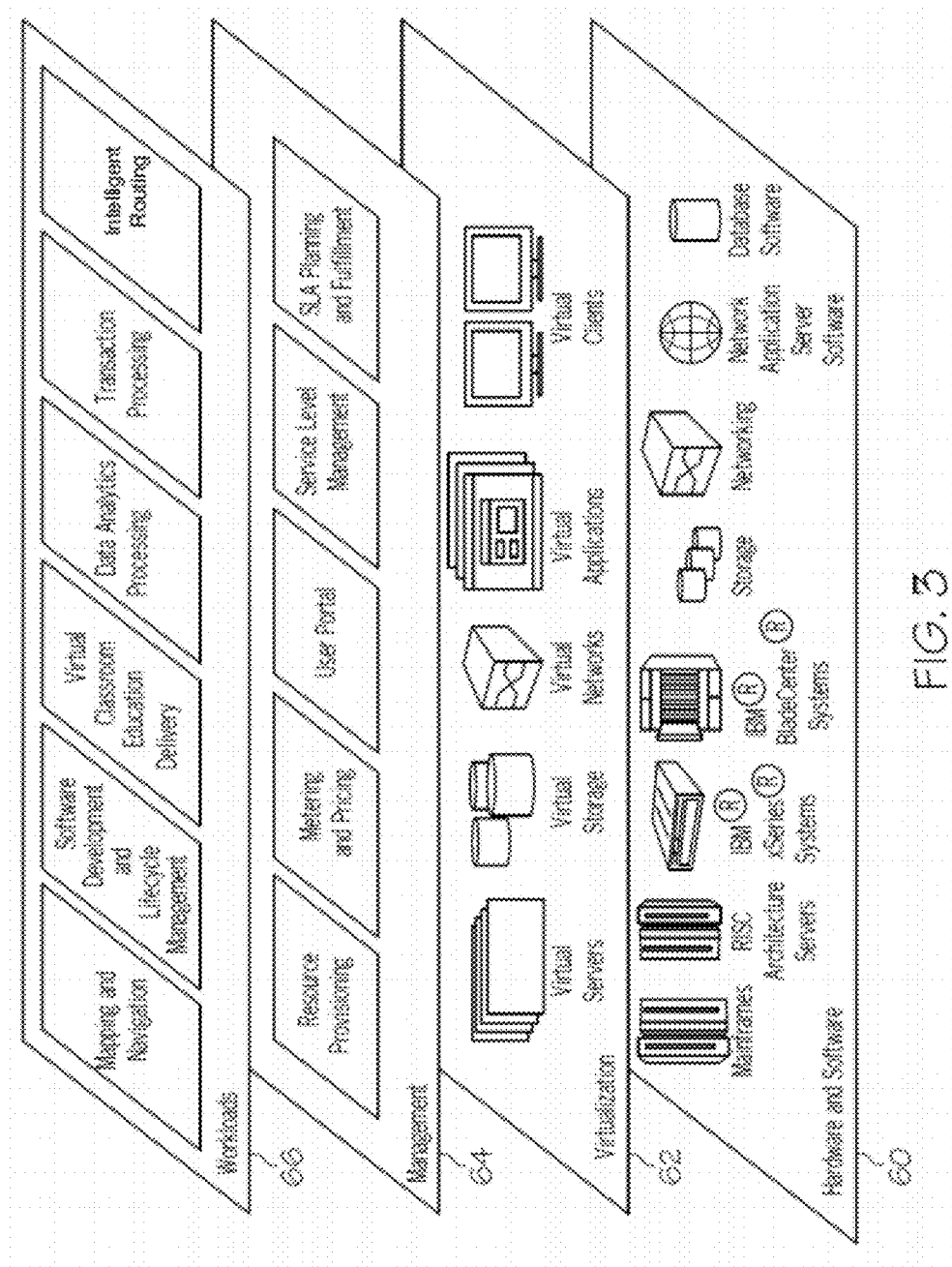
FIG. 3 depicts an exemplary embodiment of an abstraction model layer.

Reference is now made to FIG. 3, which illustrates an exemplary embodiment of a set of functional abstraction layers provided by cloud computing environment 50 (FIG. 2). It should be understood in advance that the components, layers, and functions shown in FIG. 3 are intended to be illustrative only and does not in any way limit the scope of the embodiments of the invention thereto. Following layers and corresponding functions provided as s set of functional abstraction layer are discussed herein below.

Hardware and software layer 60 includes at least one or more hardware components and at least one or more software components. Examples of hardware components include and are not limited to mainframes, which in one example includes IBM® zSeries® systems; RISC (Reduced Instruction Set Computer) architecture based servers, which in one example includes IBM pSeries® systems; IBM xSeries® systems; IBM BladeCenter® systems; storage devices; networks and networking components. Examples of software components include and are not limited to network application server software, which in one example includes IBM WebSphere® application server software; and database software, which in one example includes IBM DB2® database software. IBM, zSeries, pSeries, xSeries, BladeCenter, WebSphere, and DB2 are trademarks of International Business Machines Corporation registered in the United Stated of America and several other jurisdictions worldwide.

In a further embodiment, virtualization layer 62 presents an abstraction layer from which a number of examples of virtual entities may be provided: virtual servers; virtual storage; virtual networks, including virtual private networks; virtual applications and operating systems; and virtual clients.

In one exemplary embodiment, management layer 64 may provide a number of functions as described below, and it should be obvious to one skilled in the art that these are not limitations defining the scope of the embodiments of the invention. Resource provisioning for example provides dynamic procurement of computing resources and other resources that are utilized to perform tasks within the cloud computing environment. Metering and Pricing for example provide cost tracking as resources are utilized within the cloud computing environment, and billing or invoicing provide for example details related to consumption of these resources. In one exemplary embodiment, these resources may comprise application software licenses. Security provides for example identity verification for cloud consumers and tasks, as well as protection for data and other resources. User portal provides for example access to the cloud computing environment for consumers and system administrators. Service level management provides for example cloud computing resource allocation and management such that required service levels are met. Service Level Agreement (SLA) planning and fulfillment provide for example pre-arrangement for, and procurement of, cloud computing resources for which a future requirement is anticipated in accordance with an SLA. The exemplary embodiments provided hereinabove should not be construed as limitations on the embodiments of the invention.

Workloads layer 66 provides examples of functionality for which the cloud computing environment may be utilized. Examples of workloads and functions which may be provided from this layer and include but not limited to mapping and navigation; software development and lifecycle management; virtual classroom education delivery; data analytics processing; transaction processing; and intelligent routing that controls the location of physical storage of cloud consumer data in the cloud computing environment 50.

The cloud environment 50 may consist of numerous locations where data may be physically stored. For example, a plurality data storage devices used in the cloud environment 50 may be located in different geographical regions around the world. In accordance with embodiments of the invention herein, a cloud consumer, such as an owner and/or user of a local computing device such as 54A, 54B, 54C, 54N, may specify one or more geographical regions (e.g., continents, countries, states, etc.) where the user requires the data is to be physically stored. Based upon the user specification, the "routing", preferably built with "intelligence", functionality of the embodiments of the invention causes the cloud consumer data to be routed to and saved at an appropriate physical storage location within the specified geographical region(s). In this manner, embodiments of the invention provide for the compartmentalization of files for storage and/or business process execution into a specific geographical region inside a cloud as required by for example specific statues, regulations, business need, or any other reason.

It should be obvious to a person of ordinary skill in the art that due to the diverse geographical regions of many of the hardware elements in the cloud environment 50, cloud computing faces a number of challenges associated especially with respect to data security and legal compliance, where legal compliance is specific to countries. The nodes 10 and, in particular, the servers 12 and storage devices of a cloud environment 50 may be located in numerous different geographical regions, e.g., different countries around the world. Typically, when a user stores data in the cloud environment 50, the user has no control over where their data is physically stored. However, there are some laws and/or regulations that mandate having certain electronic data residing on computing devices within the geographical boundary of a country/region, and proper approvals will be required from different sources, for example governmental sources etc., before data can be stored outside of the acceptable geographical boundary. Such requirements become a nuisance for people that work in a public cloud or a multi-national private cloud which is spread across data centers residing in different counties and/or continents.

Embodiments of the invention address some of these challenges by providing the user, for example a cloud consumer, with the ability to specify/select one or more acceptable geographical regions for storing the desired data. In one embodiment, the user may make such specifications using attributes (such as file attributes and the likes) and/or a set of predefined rules. The set of predefined rules may be based on at least one of: file content; semantic data; user identity; group association; or device location. In accordance with the embodiments of the invention, a routing system 80 shown in FIG. 1 analyzes the attributes and/or predefined rules and routes the user data to be stored in the user-specified location. Therefore, a user may stipulate where the data should be physically stored, rather than simply placing their data on the cloud without regard to where the data may physically reside. Stated differently, the user may employ embodiments of the invention to prevent the users data from being physically stored at one or more undesired locations. Such control of data storage location can be useful for compliance with laws/statues, regulations, business practices, personal preferences, etc.

Figure 4:
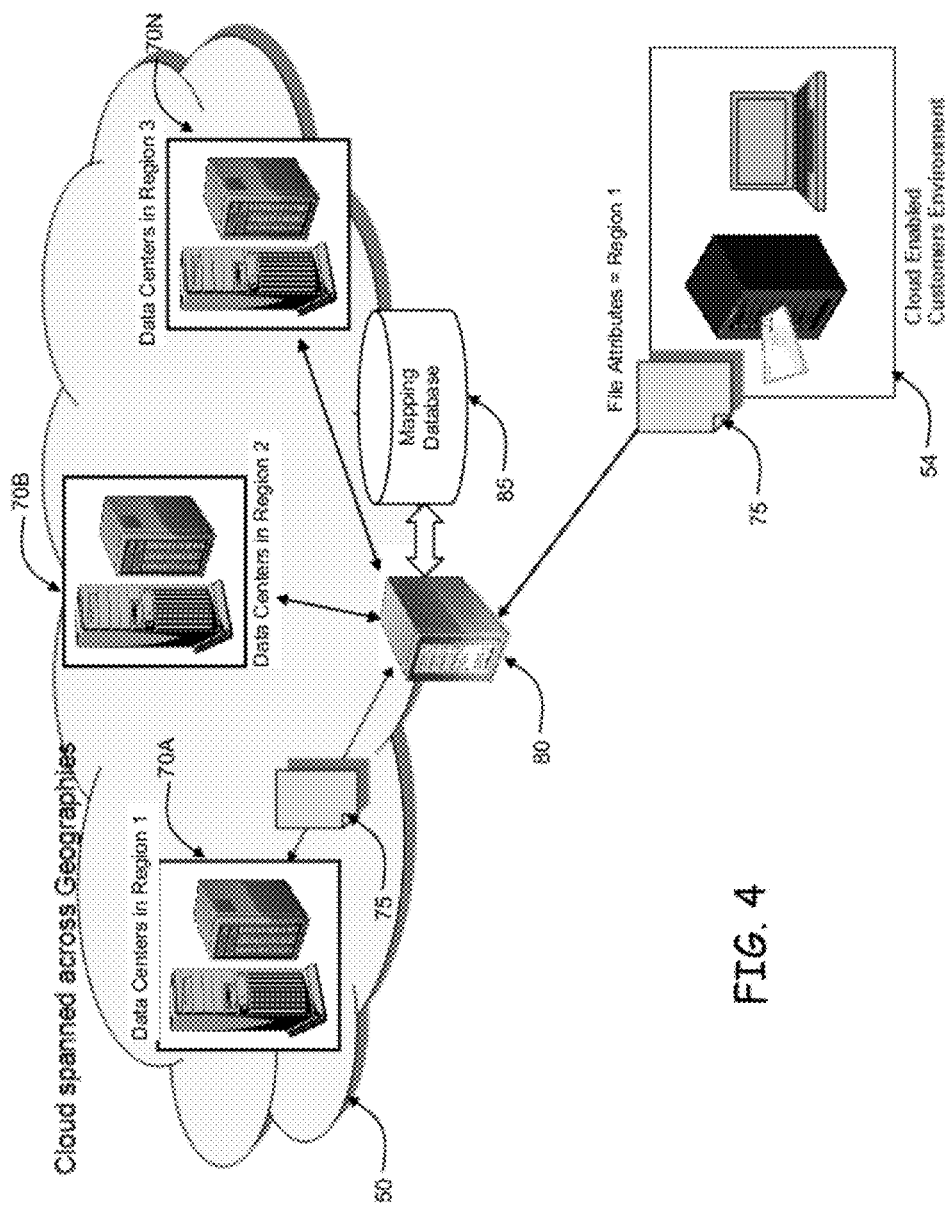
FIG. 4 depicts an exemplary embodiment of an operation in a cloud.

FIG. 4 depicts an exemplary embodiment of an operation within the cloud environment. As illustrated in FIG. 4, a cloud environment 50 may include a plurality of data storage centers 70A, 70B, 70N, located in different geographical regions. For example, data storage center 70A may be located in the Region 1, data center 70B may be located in the Region 2, and data storage center 70N may be located in Region N (N is an integer). These depicted locations are merely exemplary in nature, and there may be any number of data storage centers located in any desired locations throughout the world.

FIG. 4, illustrates in accordance with embodiments of the invention, when a user of a local computing device 54 saves data 75 onto the cloud environment 50, the routing system 80 first analyzes at least one of attributes and/or predefined rules associated with at least one of the data 75, the user, and/or the local computing device 54. Based on the at least one of attributes and/or predefined rules, the routing system 80 causes/routes the data 75 to be stored in a particular data storage center 70A-N in the cloud environment 50. In the exemplary embodiment illustrated in FIG. 4, the routing system 80 causes the data 75 to be physically stored at the data storage center 70A located in Region 1. As used herein in accordance with the embodiments of the invention, a local computing device 54 refers to any local computing device 54A-N described in the embodiments of FIG. 2, which may communicate with the cloud environment 50. Furthermore, data 75 refers to any data/content/information that may be stored in the cloud environment 50 including, but not limited to, a file, and may in one embodiment structured data, unstructured data or a combination thereof.

In embodiment of the present invention, the routing system 80 may be located/placed in any one of the nodes 10 of the cloud environment 50. For example, the routing system 80 may be in the form of a hardware element and/or software element and/or a combination of hardware and software in one or more nodes 10. The routing system 80 may be integrated for example with a cloud data management module and interfaced between the local computing device 54 and the remaining cloud environment 50. In an alternate embodiment, the routing system 80 may be in the form of one or more of the nodes 10, or may be a stand-alone device in communication with one or more of the nodes 10.

In further embodiments, the routing system 80 may include or communicate with one or more repositories 85 which map the data storage centers 70A-N with details of the geographic regions where the respective data storage centers 70A-N are located, wherein the repositories 85 may contain structure data or unstructured data or a combination thereof of structured and unstructured data with an proper relationship defined.

A person of ordinary skill in the art will appreciate that the embodiments of the present invention, disclosed herein, including the routing system 80 and the functionality provided therein, may be embodied as a system, method or computer program product. Accordingly, embodiments of the present invention may take the form of an entirely hardware embodiment, an entirely software embodiment (including firmware, resident software, micro-code, etc.) or a combination thereof, such as an embodiment combining software and hardware aspects that may all generally be referred to herein as a "circuit," "module" or "system." Furthermore, embodiments of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In an exemplary embodiment (not shown in the FIGs) an interface is provided to the user, which includes a properties window that is presented on a local computing device, e.g., local computing device. The interface may be presented on the local computing device in response to the user performing a prescribed pattern of mouse clicks, keystrokes, touch-screen selections, etc. As but one of many possible examples, the interface may be presented when the user selects an existing file, right-clicks the mouse pointer on the selected file, and selects "Properties" from a menu. Additionally or alternatively, the interface may be automatically presented to the user on the local computing device when a file is being saved.

In one embodiment, the interface is a geographical region selection portion that includes at least one selectable geographical region. The geographical regions may be provided to the local computing device by the intelligent routing system which determines the available storage locations (e.g., data storage centers 70A-N) from the cloud computing environment (e.g., cloud computing environment 50) and one or more mapping databases (e.g., database(s) 85). The mapping database (e.g., database(s) 85) defines an association between respective geographic regions and storage locations (e.g., data storage centers 70A-N).

A user of the local computing device may select one or more of the selectable geographical regions, for example, by clicking a check-box with their mouse. The selectable geographical regions correspond to physical locations where data may be physically stored in the cloud computing environment, e.g., cloud computing environment 50. By selecting one or more of the selectable geographical regions, the user specifies one or more geographical regions where this particular file may be physically stored in the cloud environment. One or more selected locations are saved as a file attribute that can be analyzed by the routing system for determining where to save the file in the cloud environment.

The interface provides in one embodiment selectable geographical regions including: the Americas, Europe, Asia, Pacific, Africa, and Australia. These geographical regions are merely exemplary, however, and any desired geographical regions and any number of desired geographical regions may be presented in the geographical region selection portion. Moreover, the geographical regions may be defined with any desired level of granularity including, but not limited to, continents, sub-continents, countries, states, cities, municipalities, counties, postal codes, and any other defined geographic area.

The interface may additionally be provided with a field that provides one or more sub-levels of granularity. For example, if the user has selected the Americas in geographical region, the user is presented with a list of geographical regions of finer levels of the granularity. The finer level of granularity presented in list may be a finer level of granularity of the particular selection, or a finer level of granularity of all of the possible selectable geographical regions. The user may select one or more geographical regions from the list thereby narrowing down the geographical regions where the file may be saved in the cloud environment. It should be obvious to one skilled in the art that any number of desired additional levels of granularity may be provided to the user for making an appropriate selection.

In embodiments, the one or more geographical regions selected by the user are stored as one or more extended file attributes associated with the particular file. These attributes may be stored temporarily at the local computing device and/or the routing system, and may be stored permanently with the file in accordance with standard practices for maintaining other file attributes. In accordance with the embodiments of the invention, the extended file attribute specifying the user-selected geographic region for storing the file may be incorporated into any file system and/or an interoperable access control list (ACL) supported by a file system. In one embodiment, when a user selects one or more of the geographical regions, a corresponding file attribute is created and associated with the file. The file attribute may be analyzed by the intelligent routing system for determining where to save the file in the cloud computing environment.

In one embodiments, the routing system is configured to read and parses the file attributes of a file that specify the desired geographical region, and the routing system causes the file to be stored at a location within the cloud environment corresponding to the geographical region specified by the file attributes. For example, when a user is initially saving a file, the routing system can read the file attributes and routes the file to a data storage center in a corresponding geographical region. As another non-limiting example, when a user changes the selected geographical region for a file that is already stored in a first data storage center in the cloud, the routing system copies the file from a first data storage center in the first geographic region to a second data storage center in the newly specified geographic region, and then deletes the copy of the file from the first data storage center. For example, when a file is stored in the first data storage located in New York in the United States, and the use now selects a new geographical region to store the data in Singapore in Asia, the routing system copies the files from the location in the United States to the location in Singapore and then deletes the files in the United States. Moving from one geographical location to another for example may be to reduce overhead costs associated with storing the files in storage devices in the United States.

In accordance with further embodiments of the invention, the geographical region for storing a file may be specified by a set of predefined rules, which may be an alternative to or in addition to user-specified file attributes. The predefined rules may include, for example, file content, semantic data, user identity, group association, and device location. The rules may be defined in a rules engine via appropriate method including but not limiting to coding and/or programming.

As a non-limiting example of a predefined rule, a business running over the cloud computing environment may specify in the rules engine that all files owned and/or generated by particular users are constrained to be saved to a predefined geographic region. The particular users to which this rule applied may be defined in a group based on their user identifications. In this manner, when a user accesses the cloud using one of the user identifications defined in the group, the user's files are all specified to be saved at the predefined geographical region. Using this predefined geographical region, the routing system identifies a data storage center within the predefined geographical region and routes the data to the identified data storage center. The list of user identifications in the group and the one or more predefined geographical regions associated with the group may be defined in the rules engine. The routing system may in one embodiment use this rule to store files associated with members of the group at the one or more predefined geographical regions in the cloud.

As another non-limiting example, a single user may create a predefined rule that all of his or her files are to be stored at one or more specified geographical regions. In this manner, when the user accesses the cloud, the routing system may determine from the user identification that any file saved by this user must be stored at one of the predefined specified geographical regions, identify a data storage center within the predefined geographical region, and cause the data to be saved at the identified data storage center within the predefined geographical region by routing the data to the identified data storage center within the predefined geographical region.

A group or a single user may also provide set of predefined rules with additional levels of granularity. For example, a predefined rule may specify that a file of a particular type, e.g., spreadsheet, word processing, presentation, graphics, multimedia, etc., always be saved to a specified geographic region. As another non-limiting example, the set of predefined routing rule may be based on textual content of the file, such that a file containing a particular word (e.g., "confidential") in the filename or within the body of the file is always saved to a specified geographical region. As yet another non-limiting example, a set of predefined routing rule may be based on metadata (e.g., semantic data) associated with the file, such that a file containing a particular metadata tag is always saved to a specified geographical region. These examples of predefined rules are intended to be illustrative of the embodiments of the invention, and are not intended to limit the scope of the embodiments of the present invention. Any type of predefined rule based on any desired parameter may be programmed into the rules engine and used by the routing system to save data to a data storage location within a specified geographical region.

In further embodiments, one or more predefined rules may be based on an identification and location of the local computing device (e.g., local computing device). For example, a predefined rule may be implemented such that a local computing device, such as mobile phone, laptop computer, etc., is confined to saving data to physical storage locations in the cloud which storage locations correspond to a geographical region containing the current location of the local computing device. In particular, the current location of the local computing device may be determined by global positioning system (GPS), or any other suitable method, to be within a particular geographical region. Based on the predefined rule, any data owned by or associated with the local computing device can only be saved to physical data storage locations within the particular geographical region, e.g., the United States. Access to data may be restricted in a similar manner. For example, when the local computing device is determined to be currently located within a particular geographical region, the local computing device may be confined to access data that is physically stored only at locations within the particular geographical region. Such rules may be beneficial for businesses and/or governments wishing to control data access by their employees, agents, officials, etc., in order to comply with laws, regulations, best practices, etc.

In one embodiment, the predefined rules described herein may be defined and implemented in appropriate programming at the routing system and/or at the user's local computing device. For example, properties of one or more predefined rules may be input and stored locally or may be stored in a remote depository such as a Lightweight Directory Access Protocol (LDAP) that is accessible by at least one of the routing system and/or at the local computing device. The predefined rules may be used in addition to or as an alternative to the extended file attributes specified by the user. Also, more than one predefined rule may be applied at any given time. For example, a user may be defined as a member of a group with specified geographical regions, and the user may also have defined one or more rules based on the file type and textual content. In these situations, the predefined rules are applied in combination to arrive at one or more geographical regions that satisfy all of the applicable rules.

In one embodiment when one or more predefined rules exist, the interface presented to the user may be adjusted according to the predefined rules. For example, the interface may be presented to the user in a manner such that only the geographical regions specified in the predefined rules are available as user-selectable choices. Stated differently, geographical regions that are not permitted by any applicable predefined rules, i.e., those not satisfying the predefined rules, are either not included in the interface, or are shown but not selectable in the interface. When a predefined rule results in only a single acceptable geographical region, the interface may be presented to the user in a pre-populated manner with the single geographical region already selected and no other choices available to the user. Such modification of the interface may be controlled by the routing system and/or the local computing device using the predefined rules engine and appropriate programming.

In accordance with the embodiments of the present invention, the user may be prompted with an exception message, such as a visual display on the local computing device, when there is a conflict between any of: two or more predefined rules, one or more predefined rules and user-defined extended file attributes, one or more predefined rules and a currently available data storage location, and user-defined extended file attributes and a currently available data storage location. For example, when two or more predefined rules that are applicable to a particular user and file result in no acceptable storage locations, the user may be notified of this conflict via an exception message, e.g., error message, on the local computing device. The error message may indicate that the file will not be saved on the cloud and must be saved locally on the local computing device. Additionally or alternatively, the error message may provide the user with one or more alternative geographic regions and a selectable confirmation field indicating that the user is overriding one or more of the rules.

As another non-limiting example, an error message may be presented to the user when the user has selected a location (e.g., from interface) and the routing device determines that the selected location is currently unavailable, e.g., offline, overloaded, etc. The error message may indicate that the file will not be saved on the cloud and must be saved locally on the local computing device. Additionally or alternatively, the error message may provide the user with one or more alternative geographical regions and prompt the user to select one of the alternative locations, as a temporary storage and then move the file to the desired location.

Figure 5:
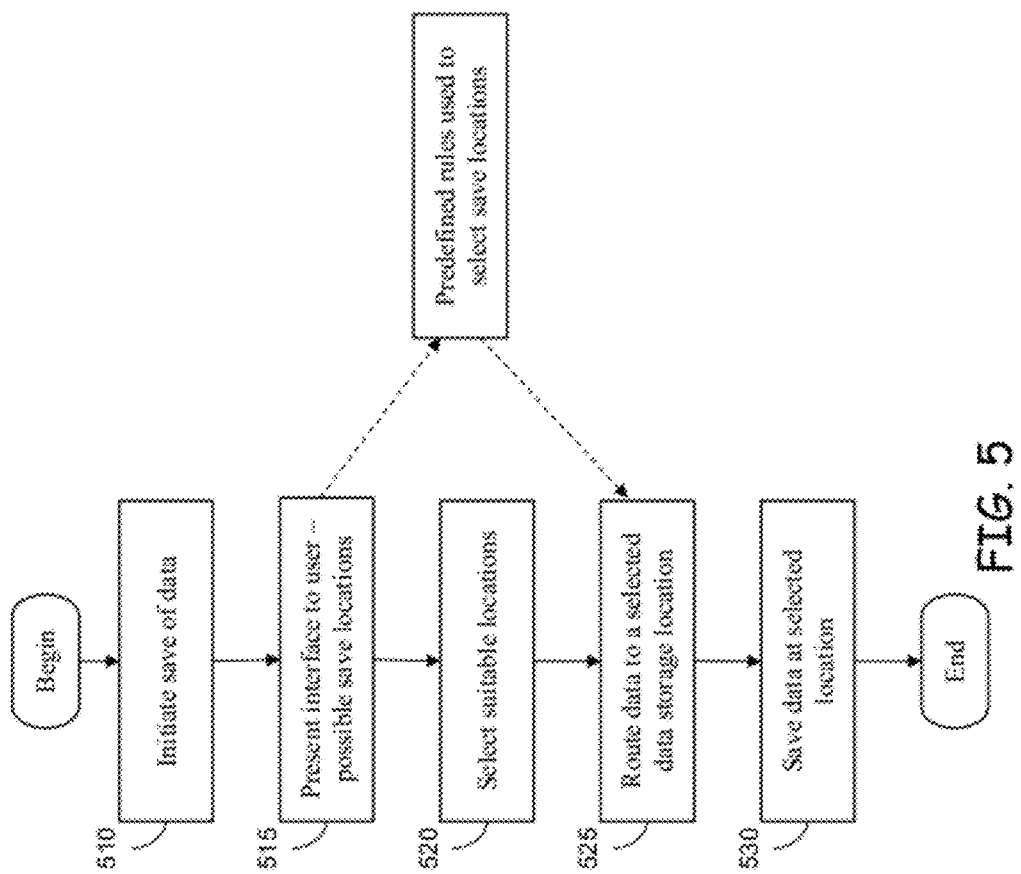
FIG. 5 depicts an exemplary method in accordance with aspects of the invention in a cloud.

FIG. 5 illustrates an exemplary embodiment of a method/flow for performing aspects of the present invention. The exemplary flowchart and block diagrams in the FIGs illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1-4. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 6 depicts an exemplary embodiment of a method/flow for a process in accordance with embodiments of the present invention. At step 510, a user of a local computer device (e.g., device 54) initiates a process to save data to the cloud environment. This may be performed in a conventional manner, such as by selecting the "Save" option in a word processing application while logged-on to the cloud computing environment.

At step 515, the use is presented with the option of choosing a possible geographical location to save the data via a user interface. In one embodiment the routing system presents the user with an interface with possible geographical regions for saving the file. For example, in the embodiments of the present invention, the routing system analyzes storage locations in the cloud and a mapping in a database, and presents available geographical regions to the user via the interface displayed on the local computer device. Step 615 may additionally include (but not necessarily) the routing system and/or the local computing device applying one or more predefined rules and modifying the available selectable geographical regions(s) presented in the interface in accordance with the rules. The predefined rules may be based on at least one of: file content, semantic data, user identity, group association, device location, etc. At step 520, the user selects one or more of the geographical regions in the interface. It should be obvious to one skilled in the art, that based on the predefined rules, the geographical location may be automatically be assigned.

At step 525, the routing system routes the data to a data storage center (e.g., data storage centers 70A, 70B, 70N) located within the user-selected geographical region(s). This may be performed by routing the data over appropriate network connections in the cloud environment. At step 530, the data is physically stored at the data storage center.

In yet a further exemplary embodiment, a user of a local computer device (e.g., device 54) initiates a process to save data to the cloud environment. This may be performed in a conventional manner, such as by selecting the "Save" option in a word processing application while logged-on to the cloud computing environment. The routing system and/or the local computing device apply one or more predefined rules and determine a geographical region where the data is to be saved based on the predefined rules. The predefined rules may be based on at least one of: file content, semantic data, user identity, group association, and device location, amongst other rules, and is performed without analyzing any user-selected extended file attributes. In this manner, this implementation of the invention routes the data to a physical storage location within a predefined geographic region based on predefined rules alone without any user-selected extended file attributes.

In a further embodiment, the routing system routes the data to a data storage center (e.g., data storage centers 70A, 70B, 70N) located within the predefined geographical region(s). This may be performed by routing the data over appropriate network connections in the cloud computing environment, and the data is physically stored at the data storage center.

In yet a further embodiment, the routing system receives a request from a local computing device to save data on the network (e.g., cloud environment 50). The routing system determines a specified geographical region in which to save the data by analyzing at least one of: file attributes associated with the data, and predefined rules. The file attributes may be a user-selected file attribute as described previously, and may be analyzed by the routing system to determine one or more corresponding specified geographical regions. The predefined rules may specify one or more geographical regions based on any of file content, semantic data, user identity, group association, and local computing device location, as described herein.

The routing system is configured to identify a data storage location in the specified geographical region, which includes comparing the specified geographical regions determined to a mapping database (e.g., database 80) that defines an association between respective geographical regions and data storage locations (e.g., data storage centers 70A-N) available on the cloud. The routing system causes the data to be saved at the identified data storage location within the specified geographical region by routing the data to the identified data storage location within the specified geographical region, and data storage center physically saves the data.

In one embodiment, a service provider, such as a Solution Integrator, cloud offer to perform the processes described herein. In this case, the service provider can create, maintain, deploy, support, etc., the computer infrastructure that performs the embodiments of the invention for one or more customers. These customers may be, for example, any business that uses technology, and in return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method for managing data in a cloud, the method comprising:
    receiving a request from a user, wherein the request includes information to store data within a cloud environment, the cloud environment comprising a plurality of data storages coupled to each other over a network, and the plurality of data storages being located in different geographical regions around the world;
    determining, from the request, a set of pre-defined attributes or pre-defined rules associated with the user, the set of pre-defined attributes or pre-defined rules stipulating two or more acceptable geographic regions within which the data can be stored;
    displaying to the user a listing of the two or more acceptable geographic regions within which the data can be stored;
    selecting the two or more acceptable geographic regions;
    saving the selected two or more acceptable geographic regions as a file attribute;
    receiving a selection from the user selecting two or more of the one or more acceptable geographic regions in the list;
    routing the data to be stored to a specific location of storage within the cloud environment using a routing system configured with the cloud environment, the specific location of storage being the one or more acceptable geographic regions selected by the user;
    storing the data to be stored to a specific location of storage within the cloud environment, the specific location of storage being the one or more acceptable geographic regions selected by the user;
    receiving a second request from the user to switch the specific location of storage of the data to a second specific location of storage located at one or more acceptable geographic regions in the list previously received from the user; and
    copying the data from the specific location of storage to the second specific location of storage located at the one or more acceptable geographic regions in the list previously received from the user, and deleting the data from the specific location of storage.

2. The method as claimed in claim 1, wherein routing the data to be stored to a specific location within the cloud environment comprises
    determining a set of pre-defined attributes associated with the data; and
    selecting the specific location of storage within the cloud environment based, in part, on the set of pre-defined attributes associated with the data.

3. The method as claimed in claim 1, wherein the data may be structured or unstructured.

4. The method as claimed in claim 1, wherein the attribute includes checking for any regulatory compliance.

5. The method as claimed in claim 1, wherein the set of pre-defined rules is selected by the user.

6. The method as claimed in claim 1, wherein a routing system associated with the cloud is configured to read and parse at least the set of pre-defined attributes or the pre-defined rules to select the specific location of storage for the data within the cloud environment.

7. A system configured for managing data in a cloud comprising;
    a memory; and
    a processing device operable with the memory, the processing device configured for:
        determining, from the request, a set of pre-defined attributes or pre-defined rules associated with the user, the set of pre-defined attributes or pre-defined rules stipulating two or more acceptable geographic regions within which the data can be stored,
        displaying to the user a listing of the two or more acceptable geographic regions within which the data can be stored,
        selecting the two or more acceptable geographic regions;
        saving the selected two or more acceptable geographic regions as a file attribute,
        receiving a selection from the user selecting two or more of the one or more acceptable geographic regions in the list,
        routing the data to be stored to a specific location of storage within the cloud environment using a routing system configured with the cloud environment, the specific location of storage being the one or more acceptable geographic regions selected by the user,
        storing the data to be stored to a specific location of storage within the cloud environment, the specific location of storage being the one or more acceptable geographic regions selected by the user,
        receiving a second request from the user to switch the specific location of storage of the data to a second specific location of storage located at one or more acceptable geographic regions in the list previously received from the user, and
        copying the data from the specific location of storage to the second specific location of storage located at the one or more acceptable geographic regions in the list previously received from the user, and deleting the data from the specific location of storage.

8. The system as claimed in claim 7, wherein routing the data to be stored to a specific location within the cloud environment comprises
    determining a set of pre-defined attributes associated with the data; and
    selecting the specific location of storage within the cloud environment based, in part, on the set of pre-defined attributes associated with the data.

9. The system as claimed in claim 8, wherein the attribute includes checking for any regulatory compliance.

10. The system as claimed in claim 7, wherein the data may be structured or unstructured.

11. The system as claimed in claim 7, wherein the set of pre-defined rules is selected by the user.

12. The system as claimed in claim 7, further comprising a routing system associated with the cloud, wherein the routing system is configured to read and parse at least the set of pre-defined attributes or the pre-defined rules and to select the specific location of storage for the data within the cloud environment.

13. A system as claimed in claim 7, wherein the network comprises a cloud infrastructure coupled at least by one of a wired mean, a wireless means or a combination thereof.

14. A non-transitory computer readable storage medium including a set of instructions that, when executed, cause at least one processor to perform steps comprising:

receiving a request from a user, wherein the request includes information to store data within a cloud environment, the cloud environment comprising a plurality of data storages coupled to each other over a network, and the plurality of data storages being located in different geographical regions around the world;

determining, from the request, a set of pre-defined attributes or pre-defined rules associated with the user, the set of pre-defined attributes or pre-defined rules stipulating two or more acceptable geographic regions within which the data can be stored;

displaying to the user a listing of the two or more acceptable geographic regions within which the data can be stored;

selecting the two or more acceptable geographic regions;

saving the selected two or more acceptable geographic regions as a file attribute;

receiving a selection from the user selecting two or more of the one or more acceptable geographic regions in the list;

routing the data to be stored to a specific location of storage within the cloud environment using a routing system configured with the cloud environment, the specific location of storage being the one or more acceptable geographic regions selected by the user;

storing the data to be stored to a specific location of storage within the cloud environment, the specific location of storage being the one or more acceptable geographic regions selected by the user;

receiving a second request from the user to switch the specific location of storage of the data to a second specific location of storage located at one or more acceptable geographic regions in the list previously received from the user; and copying the data from the specific location of storage to the second specific location of storage located at the one or more acceptable geographic regions in the list previously received from the user, and deleting the data from the specific location of storage.

15. The computer program product as claimed in claim 14, further operable for determining a set of pre-defined attributes associated with the data, and selecting the specific location of storage within the cloud environment based, in part, on the set of pre-defined attributes associated with the data.

16. The computer program product as claimed in claim 14, wherein the data may be structured or unstructured.

17. The computer program product as claimed in claim 14, further operable for checking for any regulatory compliance as part of the set of pre-defined attributes.

* * * * *